(12) United States Patent
Dix et al.

(10) Patent No.: US 7,766,379 B2
(45) Date of Patent: Aug. 3, 2010

(54) SIDE AIRBAG APPARATUS AND METHOD

(75) Inventors: Jeffery Carl Dix, Farmington Hills, MI (US); Ronald Alonzo Bowers, Farmington Hills, MI (US); Joseph Mueller, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 309 days.

(21) Appl. No.: 11/860,079

(22) Filed: Sep. 24, 2007

(65) Prior Publication Data

US 2009/0079171 A1 Mar. 26, 2009

(51) Int. Cl.
*B60R 21/231* (2006.01)
(52) U.S. Cl. ............... 280/730.2; 280/743.1; 280/730.1
(58) Field of Classification Search .............. 280/730.2, 280/743.1, 730.1
See application file for complete search history.

(56) References Cited

U.S. PATENT DOCUMENTS

| 5,890,732 | A | 4/1999 | Nakamura et al. | |
|---|---|---|---|---|
| 6,991,257 | B2 | 1/2006 | Zhao et al. | |
| 7,121,580 | B2 | 10/2006 | Sato et al. | |
| 7,448,645 | B2 * | 11/2008 | Bederka et al. | 280/730.2 |
| 2006/0022441 | A1 * | 2/2006 | Hayashi et al. | 280/730.2 |
| 2006/0131847 | A1 | 6/2006 | Sato et al. | |
| 2006/0220359 | A1 | 10/2006 | Sato | |
| 2006/0232054 | A1 | 10/2006 | Schlosser et al. | |
| 2007/0228699 | A1 * | 10/2007 | Bederka et al. | 280/730.2 |
| 2007/0284859 | A1 * | 12/2007 | Kashiwagi | 280/730.2 |
| 2007/0290488 | A1 * | 12/2007 | Taguchi et al. | 280/730.2 |
| 2008/0079248 | A1 * | 4/2008 | Hayashi | 280/730.2 |
| 2009/0206585 | A1 * | 8/2009 | Honda | 280/730.2 |
| 2009/0212542 | A1 * | 8/2009 | Toda et al. | 280/730.2 |

FOREIGN PATENT DOCUMENTS

| DE | 102004031865 | 2/2006 |
|---|---|---|
| JP | 2003261000 | 9/2003 |
| WO | WO2007022766 | 3/2007 |

OTHER PUBLICATIONS

Insurance Institute for Highway Safety, Guidelines for Using the UMTRI ATD Positioning Procedure for ATD and Seat Positioning (Version V), 1005 North Glebe Road, Arlington, VA 22201Dec. 2004.
Insurance Institute for Highway Safety, Crashworthiness Evaluation Side Impact Crash Test Protocol (Version IV), Aug. 2005, 1005 North Glebe Road, Arlington, VA 22201.

* cited by examiner

*Primary Examiner*—Paul N Dickson
*Assistant Examiner*—Drew Brown
(74) *Attorney, Agent, or Firm*—Young Basile

(57) ABSTRACT

An inflatable side airbag restraint for use in passenger vehicles. The airbag includes a relief portion providing clearance for the arm and elbow of an occupant or test device which reduces or eliminates lateral compression of the arm on the chest and abdomen regions of an occupant or test device.

20 Claims, 7 Drawing Sheets

INITIAL SIDE AIRBAG (PRIOR TO INVENTION)

SIDE AIRBAG (WITH EXAMPLE OF INVENTION)

SIDE AIRBAG APPARATUS AND METHOD

FIELD OF THE INVENTION

The field of invention generally pertains to protective airbag restraints used for example in automotive applications.

BACKGROUND

Protective airbag restraints for use in passenger automobile applications have become standard equipment on almost all new vehicles sold in the United States and are common equipment on vehicles manufactured and sold throughout the world. In recent years, side airbags positioned between an occupant and the side doors of vehicles have grown in use due to their ability to provide additional safety protection in areas where there is a small impact deflection zone between the exterior of the door and the occupant.

An important and difficult area to protect in these small deflection zones is the abdomen and thorax or chest portions of the body which house vital organs. The abdominal cavity includes virtually no skeletal protection and the chest, although protected by the rib cage, is easily subject to injury.

The need for the side portions of vehicles to provide a higher level of protection for these vital bodily areas have prompted side impact federal motor vehicle safety standards (FMVSS) that automobile manufactures must pass in order to sell vehicles for use on national highways. In addition, independent organizations, for example the Insurance Institute for Highway Safety (IIHS), conduct vehicular impact tests to rate vehicle impact performance for consumers. Both the FMVSS and IIHS tests include detailed protocols for set-up and execution of the side impact tests. See for example Federal Motor Vehicle Safety Standard 214, Crashworthiness Evaluation Side Impact Crash Test Protocol (Version IV) August 2005 and Guidelines for Using the UMTRI ATD Positioning Procedure for ATD and Seat Positioning (Version V) December 2004 published by the IIHS, all incorporated herein by reference. Extensive testing programs are undertaken by major automotive manufacturers to ensure compliance with the safety standards and independent testing protocols to provide the highest level of protection for users of the manufacturer's vehicular products.

Side impact test manikins, commonly referred to as side impact dummies (SIDs), are used to examine the accelerations or forces that are representative of what actual humans would experience under certain side impacts of the particular vehicle under consideration. These SID accelerations recorded during impact testing under carefully monitored test conditions are compared to reference figures to determine what level of injury, if any, an actual human would have experienced under that test impact.

Early side airbags were generally of common geometric shapes and of substantially constant thickness. It was generally believed that larger and thicker airbag portions provided the most protection for the occupant through greater distribution of the loads generated by the impact. It was discovered that under the rapid forward and lateral deployment of conventionally-shaped and substantially constant thickness side airbags under force of the impact tended to force the SID's upper arm and elbow laterally inward into the side of the chest and abdomen regions and specifically into the ribs causing deflection or movement of the ribs toward, or farther into, the chest and abdominal cavities. This forced contact between the side airbag, arm and the thorax and abdomen was particularly acute for smaller individuals, for example fifth percentile females, i.e. females generally representing the smallest five percent of the female population. Current side impact dummies representing fifth percentile females are commonly known as SID-IIs.

It is believed that during vehicular side impact tests, and thus in actual vehicle impact events, this lateral movement or deflection of the upper arm and elbow into the chest and abdomen was due in part to the principal or resultant lateral force exerted by the airbag occurring in the arm area forward (in the vehicle) of the center point of an occupant's (or SIDs) shoulder. This resultant force occurring forward of the shoulder center point causes the arm to pivot or hinge inward toward the chest and ribs.

Numerous prior side airbag designs have included techniques for managing the forces exerted by the side airbags in the abdomen and chest regions. These techniques included controlled, sequential inflation of different parts of the airbag, use of internal tethers or strips of material sewn on the inside of the airbag, or sewing the airbag layers together in certain areas to prevent the full-width expansion of the airbag in those areas, for example, in the arm, abdomen or chest areas. These prior devices and techniques have exhibited disadvantages, particularly with smaller occupants and fifth percentile SIDs, and added much complexity to the design and manufacture of the airbags themselves, the storage of the complex airbags in concealed compartments and the procedures used to inflate the airbags during an impact event.

SUMMARY

The invention includes a side airbag apparatus and method of use. In one example, the side airbag is sized to cover and protect the shoulder, arm, chest, abdomen and pelvic areas of an occupant or SID facing a vehicle interior side panel or door (or simulated side panel or door). During inflation and in a fully inflated state, the airbag includes a relief portion along a forward or first edge of airbag positioned between the shoulder or shoulder center axis and the elbow of a seated occupant or SID. During inflation of the airbag, the relief portion provides a clearance or space between the laterally expanding airbag and the arm of the occupant or SID to reduce the contact between the side airbag and the arm thereby reducing or eliminating contact by the arm and elbow of the occupant or SID with the chest and abdomen areas.

In one example, the relief portion is a closed recess or cut-out of the airbag material in an arcuate shape positioned along the forward edge of the airbag and extending rearward (in a deployed position). The recess is positioned so that the side airbag maintains a full lateral thickness in the shoulder area. In another example, the airbag maintains a constant distance or radius from the center of the shoulder to the airbag peripheral seam across a substantial portion of the top edge of the airbag.

In another example, during inflation, the side airbag exerts a principal or resultant lateral force on the shoulder in an area rearward of the shoulder center axis.

In another example, the side airbag includes a lower portion adjacent the abdomen and pelvic area which, during inflation, exerts an upward force on the occupant or SID arm toward the relief portion.

In another example, the side airbag includes an inflatable first chamber adjacent the chest and a separate high pressure second chamber adjacent the pelvis in gaseous communication with the first chamber.

DETAILED DESCRIPTION

Examples of the side airbag apparatus and method of the invention is illustrated in FIGS. 1-5 and 7A-F. The inventive side airbag may be used in automotive passenger vehicles and other vehicles or structures where side or lateral safety protection or cushioning systems are used to protect occupants or other items from injury or damage during impact events. The side airbag may also be used in Federal Motor Vehicle Safety Standard (FMVSS) tests and other side impact testing procedures, for example, those administered by the Insurance Institute for Highway Safety. The side airbag is particularly useful in vehicular side impacts with smaller occupants and, under test conditions using fifth percentile female test manikins or SID-IIs.

Figure 1:
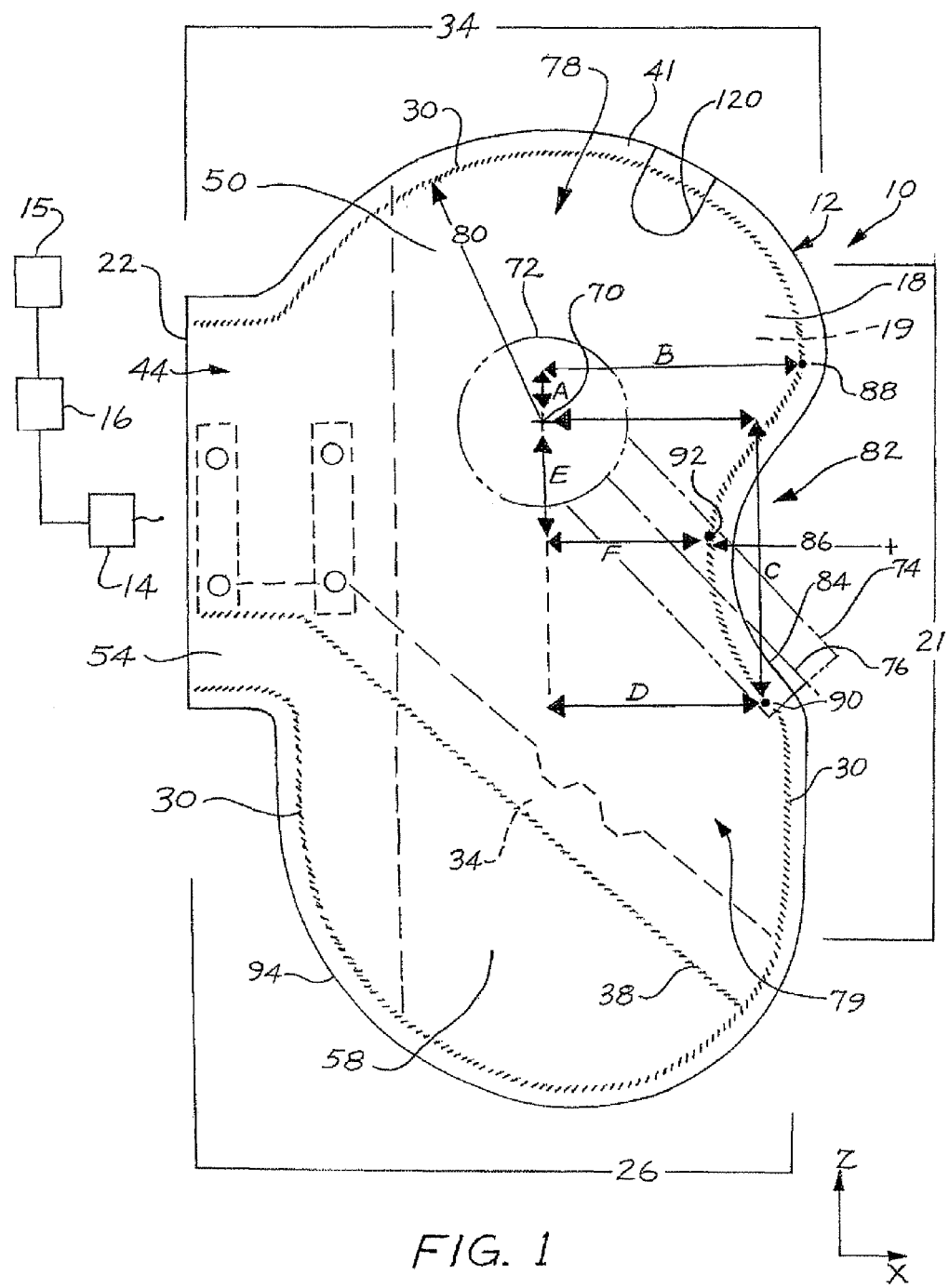
FIG. 1 is a side view of one example of a left-hand or driver's side airbag in a deployed, uninflated state with an occupant or SID shoulder and upper arm shown in phantom lines.
Figure 2:
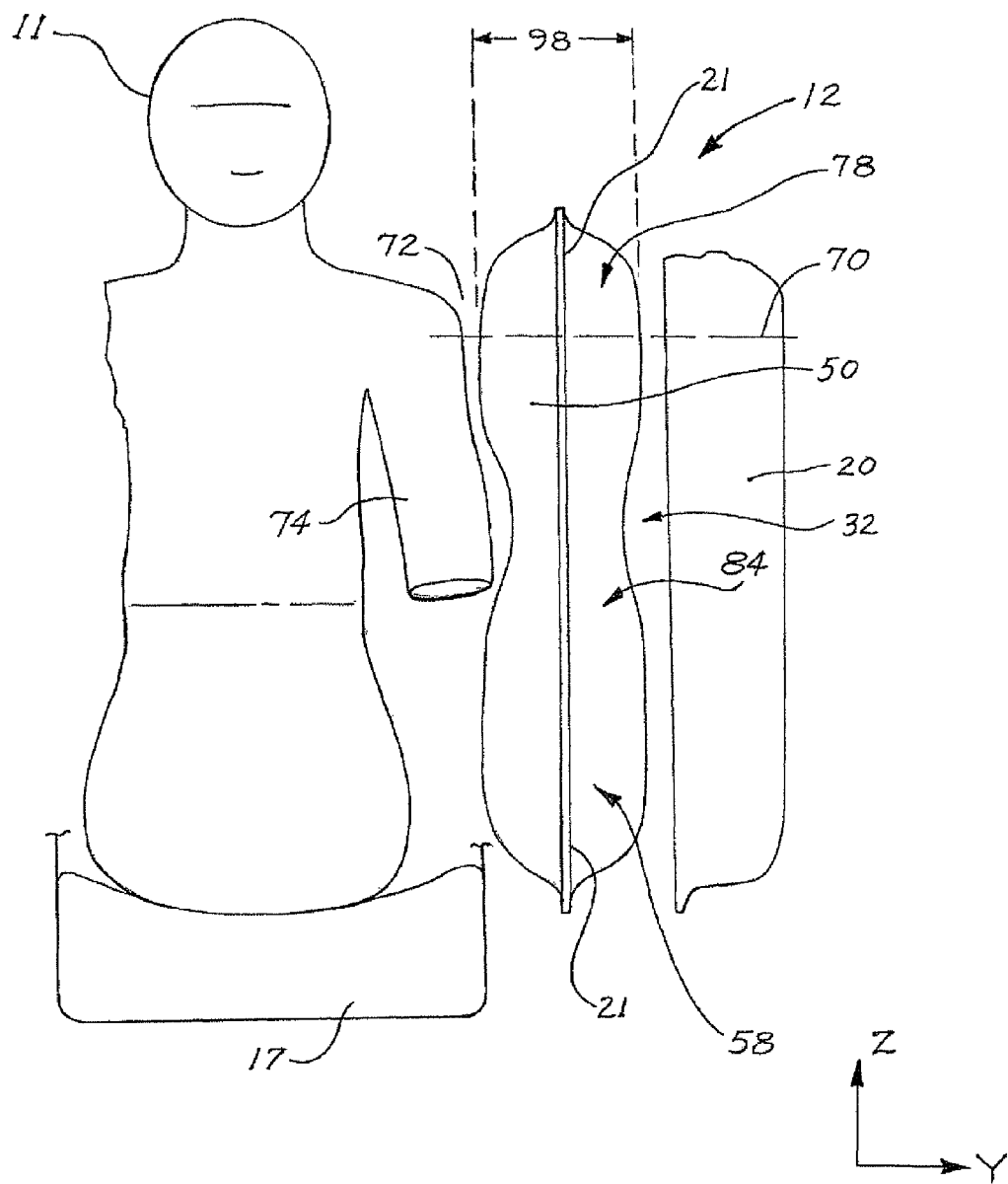
FIG. 2 is a front view of one example of a side airbag in a partially-inflated state showing an occupant arm in a static position.
Figure 3:
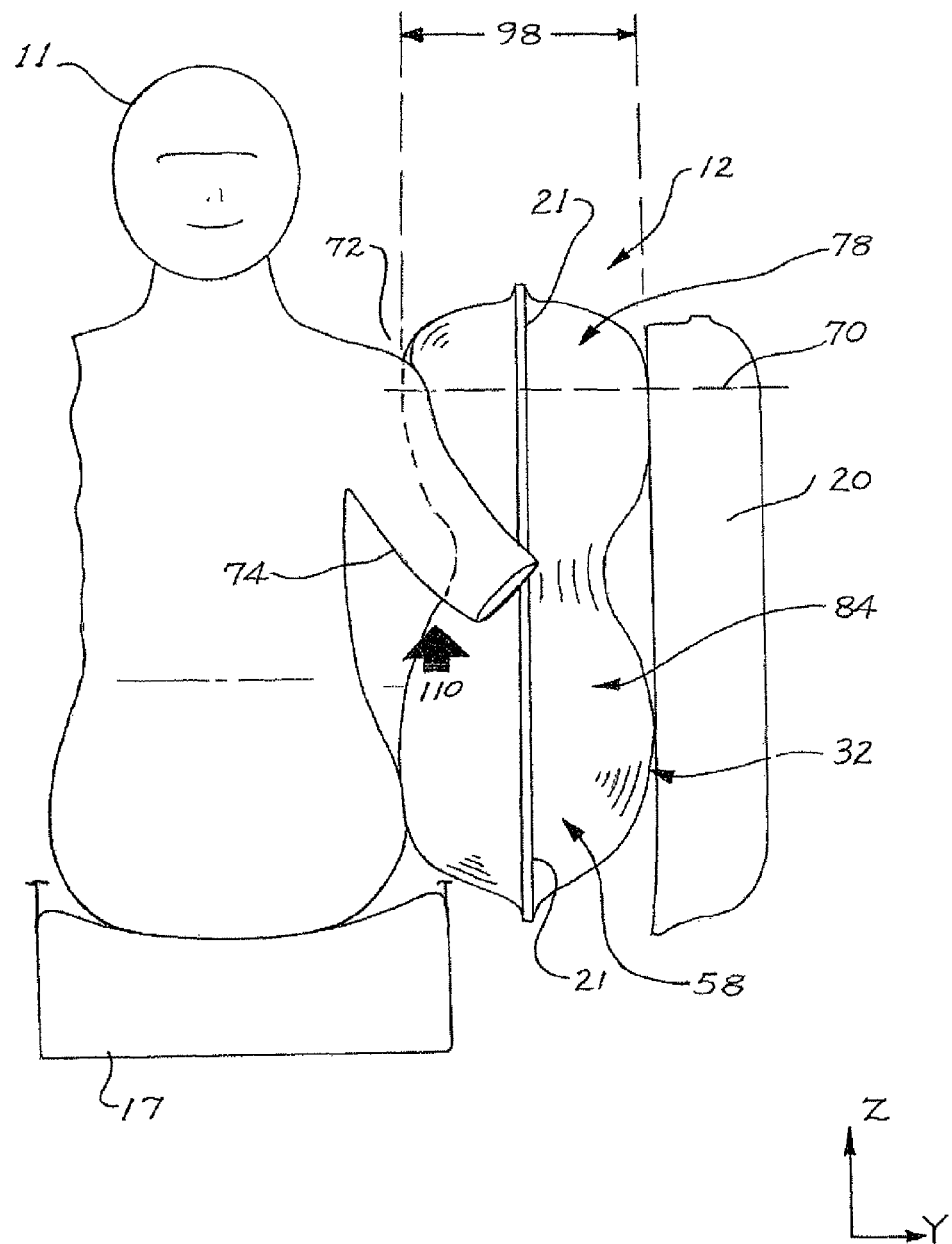
FIG. 3 is a front view of the airbag in FIG. 2 in a fully-inflated state showing an occupant or SID arm positioned in a recess in the airbag.

Referring to FIGS. 1-3, an example of the side airbag apparatus 10 is shown. In one example of the side airbag apparatus 10, the apparatus includes an airbag 12, an inflation canister 14 in fluid communication with airbag 12 and airbag inflation sensors 15 in electronic communication with a controller 16. Controller 16 is used to selectively activate inflation canister 14 to deploy and inflate the airbag 12 from a seatback of a vehicular seat 17, side door 20 or other adjacent structure (not shown). The inflation sensors 15 may be lateral acceleration sensors positioned in the vehicle, magnetic sensors which detect deflections in a vehicle door or other panel, or other sensors known by those skilled in the art. Other components of the airbag restraint system, for example attached material to compactly wrap the airbag during storage (not shown), known by those skilled in the art may be used.

In one example, airbag 12 may include a first material layer 18 and a second material layer 19 applied in overlapping relation to first layer 18. The first 18 and second 19 layers generally define a first or forward edge 21, a rearward edge 22, a top edge 24 and a bottom edge 26. As used herein the terms, forward, rearward, top and lower generally refer to directions toward the front, rear, top and lower ends or portions of a passenger vehicle respectively. First 18 and second 19 material layers are connected to one another through sewn stitches through the layers about a peripheral seam 30 extending about the forward 21, top 24 and bottom 26 edges. Material layers 18 and 19 are left substantially free from direct attachment to one another across rearward edge 22 creating a first opening 44 in fluid communication with a first expansible air chamber 50. First air chamber 50 is generally defined by first material layer 18, second material layer 19 and peripheral seam 30. First air chamber 50 is generally positioned adjacent to the thorax or chest portions of an occupant or SID. A raw or cut edge 41 of material layers 18 and 19 may extend slightly outward of peripheral seam 30. Airbag 12 may include a vent 120 in one of material layers 18 and 19. Material layers 18 and 19 may be a woven nylon material or other materials and fabrics known by those skilled in the art.

In one example, airbag 12 further includes a separate second expansible air chamber 58 positioned within first chamber 50 and having restricted fluid communication with first chamber 50 through at least one opening (not shown) in divider 34 which is attached to first 18 and second 19 layers inside first chamber 50 through a sewn seam 38. Second chamber 58 may be accessed through a second opening 54 positioned within first opening 44 and defined by divider 34. In an exemplary use, second air chamber 58 serves as an expansible pelvic airbag portion to protect the pelvic region of an occupant or SID seated in a vehicular seat 17. Second air chamber 58 may initially be subject to a higher gas inflation pressure than first chamber 50 by inflation canister 14 or an alternate inflation canister or gas source (not shown).

Referring to FIGS. 1-3, a lateral shoulder center axis 70 is shown. In this example, the shoulder center axis 70 is defined at a point in the X-direction (lengthwise, front-to-back of a vehicle) and in the Z-direction (vertical, up and down in a vehicle) corresponding to the center of the shoulder 72 of an occupant or SID seated in a vehicular seat 17. In a preferred example for side impact testing, shoulder center axis 70 is defined by the center of the shoulder 72 of a fifth percentile anthropometric test device (ATD) or SID-IIs seated on a vehicular seat 17 in accord with the Insurance Institute for Highway Safety Guidelines for Using the UMTRI ATD Positioning Procedure for ATD and Seat Positioning (Version V) December 2004. It is understood that other testing protocols in addition to the IIHS may be used such as FMVSS 214 as well as other percentile occupants or SIDs, for example $95^{th}$ and $50^{th}$ percentile, as known by those skilled in the art.

In one example using a 2007 Nissan Altima vehicle having a wheelbase of 277.5 centimeters, the shoulder center axis 70, for a fifth percentile occupant or SID-IIs, was at 1377 millimeters in the X-direction and 615 millimeters in the Z-direction (both measured from the centerline of the front wheel axle or axis). It is understood that the shoulder center axis 70 X-Z dimensional position will vary depending on the particular vehicle to be tested, for example, a vehicle having a different wheelbase from the example above and having different passenger seat heights and adjustments. Since the preferred exemplary storage position of the side airbag 12 is in the outboard portion or bolster of seat back of passenger seat 17, the relative shoulder center axis 70 positions between, for example, a fifth percentile female individual or SID-IIs, and the side airbag 12 deployed from the seat 17 will remain substantially the same.

As seen in the simulated side impact test sequence in FIG. 6, a design, development and performance challenge for conventional side airbags has existed that on rapid inflation and lateral expansion of the side airbag 12A under side impact conditions, the airbag exerts significant forces on the arm 74A forward of the shoulder center axis tending to push the upper portion of the arm 74A and elbow in a lateral direction into the chest region and more specifically the ribs. See FIG. 7 at the 20, 25, 30 and 35 millisecond photo frames. This condition with conventional airbags can lead to undesirable deflections or loads in the chest and rib areas experienced by, in the example in FIG. 7, a SID-IIs.

Referring to FIGS. 1-3, in one example, the airbag 12 of the present invention includes the general shape as defined by first layer 18, second layer 19 and peripheral seam 30 generally defining forward 21, rearward 22, top 24 and bottom 26 edges as shown. First or front edge 21 includes a relief portion 82 extending rearward or inward toward first chamber 50 from forward edge 21. In one example, relief portion 82 includes recess 84 where the first 18 and second 19 material layers are locally absent or removed from a first or a forward edge 21 and peripheral seam 30 is locally moved rearward or into the first chamber 50 to accommodate the recess and still maintain first chamber 50. In the preferred example shown in FIGS. 1-3, the recess 84 is arcuate-shaped having a radius 86 defining a first point 88 tangent to an upper portion of front edge 21, a second point 90 tangent to a lower portion of front edge 21 and an inner point 92. It is understood that other shapes where material layers 18 and 19 are removed or made easily displaceable extending rearward from forward edge 21 or into first chamber 50 to form a relief or a recess can be used.

In a preferred example shown in FIG. 1, first point 88 is positioned about 35 millimeters above (in the Z direction, shown as A in FIG. 1) and about 130 millimeters forward (along the X-direction, shown as B in FIG. 1) from shoulder center axis 70. Second point 90 is positioned about 139 millimeters below (shown as C in FIG. 1) and about 95 millimeters forward (shown as D in FIG. 1) from shoulder center axis 70. Inner point 92 is positioned about 55 millimeters below (shown as E in FIG. 1) and about 87 millimeters forward (shown as F in FIG. 1) of shoulder center axis 70. In the preferred example, radius 86 is about 240 millimeters. It is understood that variations from these specific dimensions as well as the location from a particular edge, the position, the size and the orientation may be used without deviating from the present invention.

Referring to FIG. 1, in the preferred example, with recess 84 so positioned with respect to shoulder center axis 70, the position of an occupant or SID shoulder 72 and arm 74 is shown (in phantom lines) and generally defines an arm longitudinal axis 76. In one example, the longitudinal axis 76 is positioned at about a 45 degree angle from the vertical or from the arm in a down position in accord with the Insurance Institute for Highway Safety Guidelines for Using the UMTRI ATD Positioning Procedure for ATD and Seat Positioning (Version V) December 2004. As shown in FIG. 1, for ease of illustration, when the airbag 12 is in a deployed, but uninflated (generally flat) 2-dimensional position, the lower portion of arm 74 would partially overlap the airbag lower portion 79 extending below second point 90 of recess 84. In this general position, the upper portion of arm 74 would overlap the lower portion of recess 84 when viewed laterally in the Y-direction.

Figure 4:
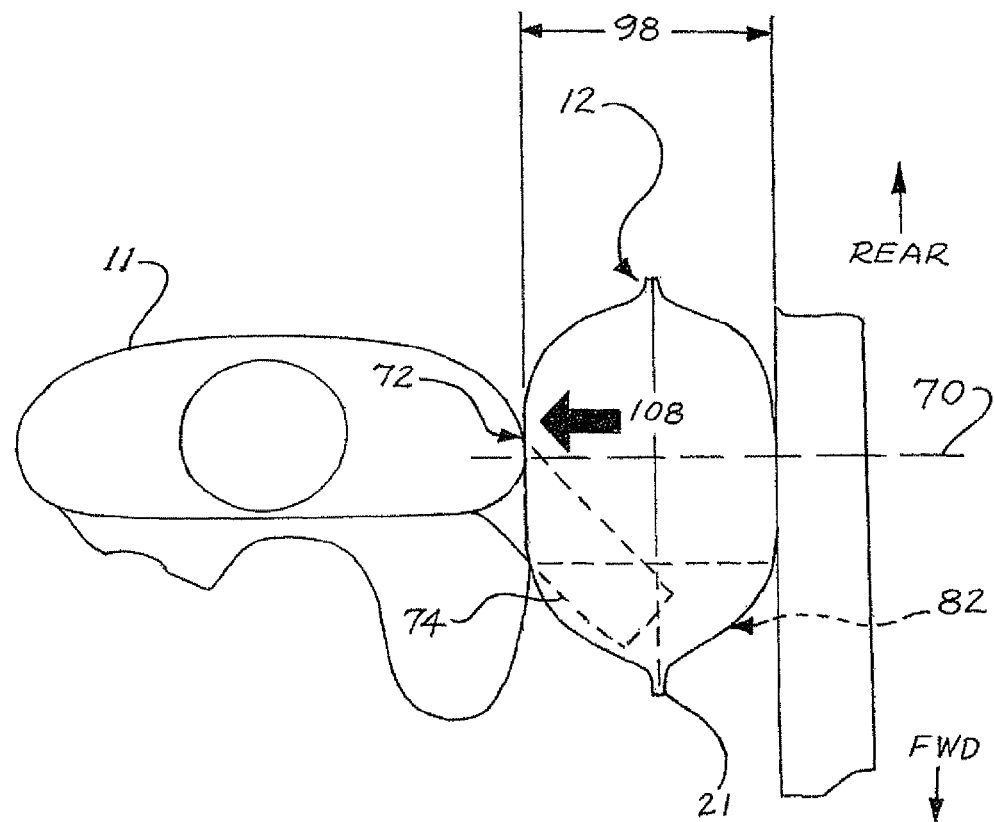
FIG. 4 is a top view of the side airbag in 3.

In the preferred example of the position of recess 84 shown in FIG. 1, recess 84 provides a clearance or space for arm 74 to be positioned during inflation as further described below. As best seen in FIGS. 2, 3 and 4, recess 84 is vertically positioned along forward edge 21 and extends rearward into first chamber 50 in such a manner that the full depth or lateral thickness 98 of airbag 12 is maintained or is not appreciably reduced or compromised in the shoulder area 72 and most preferably in the local area rearward of shoulder center axis 70. This preferred geometric shape and position of recess 84 provides the significant benefits of maintaining the high level of protection of airbag 12 in the shoulder 72 and pelvic areas while providing the significant benefits of the recess 84 with respect to the arm 74 more fully described below. As also seen in FIG. 1, top edge 24 is in part positioned at a radius 80 that remains constant over a substantial portion of top edge 24 to increase coverage and protection of shoulder 72.

As best seen in FIGS. 3, 4 and 7A-F, in a preferred example, on deployment, for example from a seatback of a vehicle seat 17, and during the rapid inflation of airbag 12, the configuration of airbag 12 and the recess 84 effectively provide a principal or resultant lateral force 108, shown in FIG. 4, on shoulder 72 and arm 74 in an area rearward of the shoulder center access 70. This effective resultant lateral force 108 tends to hinge or pivot the downwardly and forwardly extending arm 74 laterally outward or away from the SID or occupant 11 chest unlike prior conventional airbags which effectively forced the arm toward the chest region and into the rib structure (see conventional airbag in FIG. 6 as more fully discussed below). The lateral forces exerted by airbag 12 on the shoulder 72 and arm 74, which traditionally tended to laterally displace the upper arm 74 toward the chest and abdomen are, at a minimum, reduced over prior conventional side airbags.

In a preferred example, in addition and complementary to a more rearward position of the effective or resultant lateral force 108 exerted by the airbag 12, the configuration and position of airbag recess 84 provides a clearance or pocket for arm 74 along the forward edge 21 to reduce or eliminate the direct forces exerted by the airbag 12 on arm 74 and thus reduces or eliminates the lateral movement of arm 74 toward the abdomen and chest areas.

Continuing with the preferred example, as best seen in FIGS. 2, 3 and 7, during inflation, airbag lower portion 79, and most particular in the portion of airbag 12 positioned near the lower portion of recess 84, effectively provides an upward force 110 on upper arm 74 toward recess 84. This provides the dual benefit of moving arm 74 toward recess 84 to take advantage of the clearance provided thereby, and in the event that arm 74 is moving laterally inward toward the abdomen and chest, forceably rotatably raises the position of arm 74 thereby reducing lateral contact and loads by arm 74 on the chest and rib structure.

This difference in effective motion of the airbag and contact between the airbag and an arm during inflation of a conventional airbag and the present invention is effectively shown in FIGS. 6A-F and 7A-F. FIGS. 6A-F and 7A-F are illustrations depicting time-lapse photo frames taken during side impact tests at 5 millisecond intervals. Each test used a fifth percentile female SID-IIs and simulated a vehicular side impact. FIGS. 6A-F shows a simulated IIHS side impact crash test using a conventional side airbag without a relief portion 82 as generally described above. The simulated IIHS test used a production intent vehicle seat with a conventional side airbag and a SID-IIs. A sheet metal vehicle body structure was not used in the test. A crash sled including a production intent sheet metal door structure attached to wood supports designed to simulate the side impact in the IIHS protocol was used. As seen in the photos, the crash sled is rapidly moved toward the stationary seat and SID-IIs. The airbag is seen rapidly expanding and contacting the SID-IIs in the shoulder, pelvic and arm areas.

FIGS. 7A-F are depictions of a side impact test carried out substantially in accord with the IIHS Crashworthiness Evaluation Side Impact Crash Protocol (Version IV) August 2005. The test used a production intent sheet metal vehicle body structure and an example of the inventive side airbag with a relief portion 82 and a second chamber 58 in the pelvic region generally described above and illustrated in FIG. 1. As the impact barrier impacts the side of the vehicle body structure, the photos progressively show inflation of the airbag and contact with the shoulder, pelvic and arm portions of the SID-IIs.

Figure 6A:
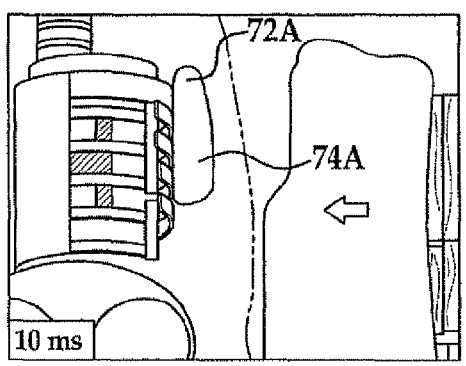
FIGS. 6A-F are illustrations of time-lapse sequential photos showing progressive expansion of a conventional side airbag in a simulateD safety standard side impact test and movement of a SID-IIs arm.
Figure 6B:
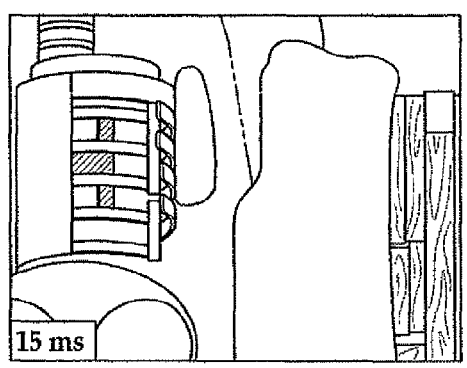
Figure 6C:
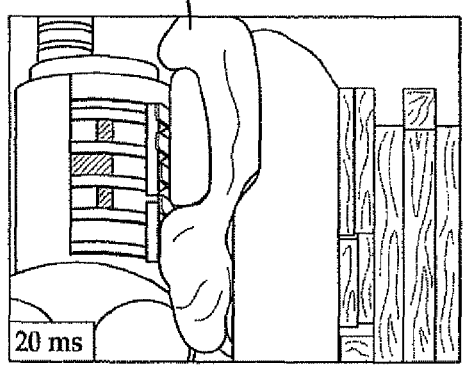
Figure 6D:
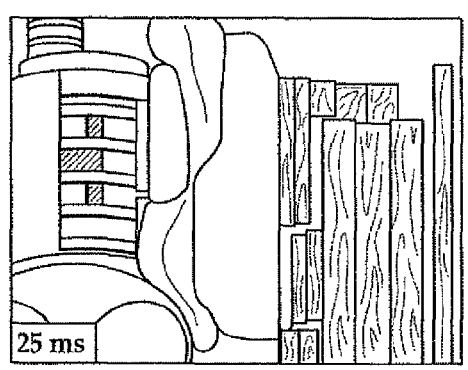
Figure 6E:
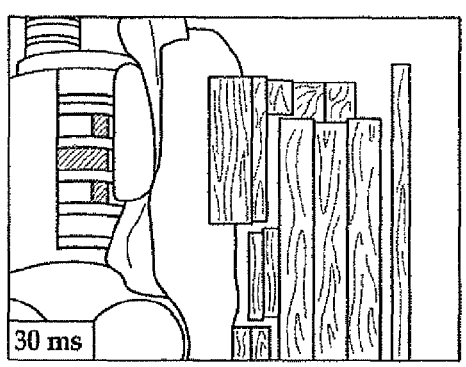
Figure 6F:
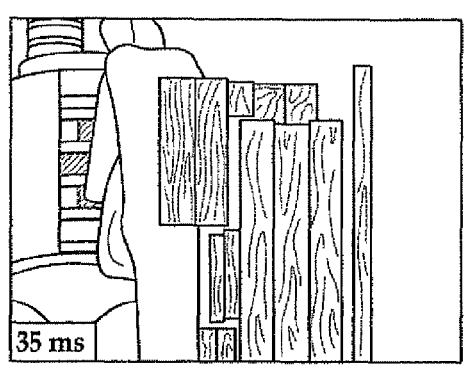

Referring to FIG. 6C, beginning at the 20 ms frame, the airbag laterally contacts the shoulder 72A and arm 74A. In the 25, 30 and 35 ms frames (FIGS. 6D, 6E and 6F respectively), due to the lateral forces exerted by the airbag, the arm is seen progressively moving in a lateral direction toward the chest and is shown displacing or compressing the adjacent ribs.

Figure 7A:
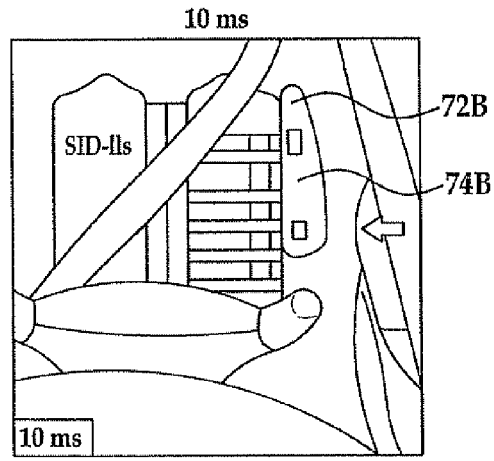
FIGS. 7A-F are illustrations of time-lapse sequential photos showing progressive expansion of an example of the inventive side airbag in a safety standard impact test and movement of a SID-IIs arm.
Figure 7B:
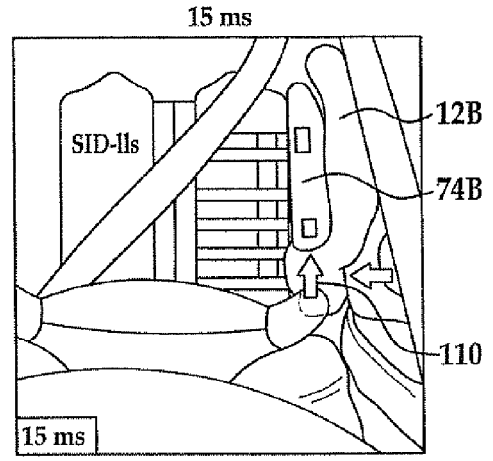
Figure 7C:
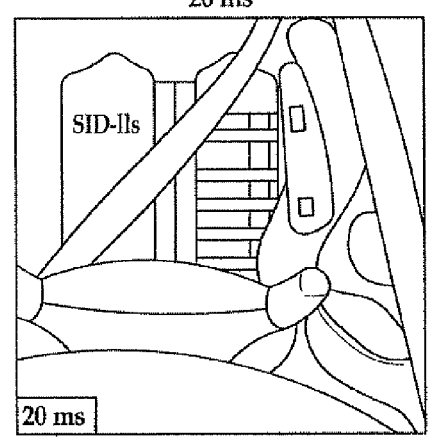
Figure 7D:
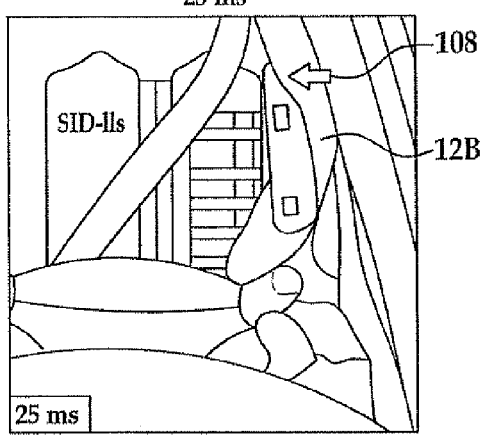
Figure 7E:
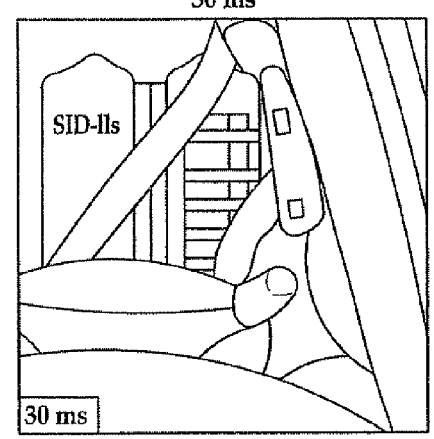
Figure 7F:
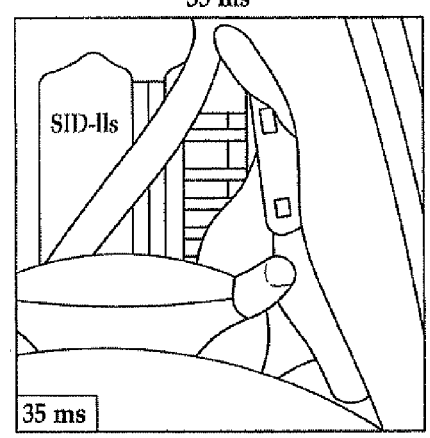

Referring to FIG. 7B, beginning at the 15 ms frame, the airbag contacts the shoulder 72B and arm 74B. At the 20 ms frame in FIG. 7C, it is observed that the lower portion of the upper arm is moving slightly upward and laterally away from the chest region and toward the relief in the forward edge. Frames 25, 30 and 35 ms (FIGS. 6D, 6E and 6F respectively) show progressive movement of the arm upward into the relief portion and laterally away or outward from the chest eliminating any contact or deflection of the ribs from the upper arm.

Figure 5:
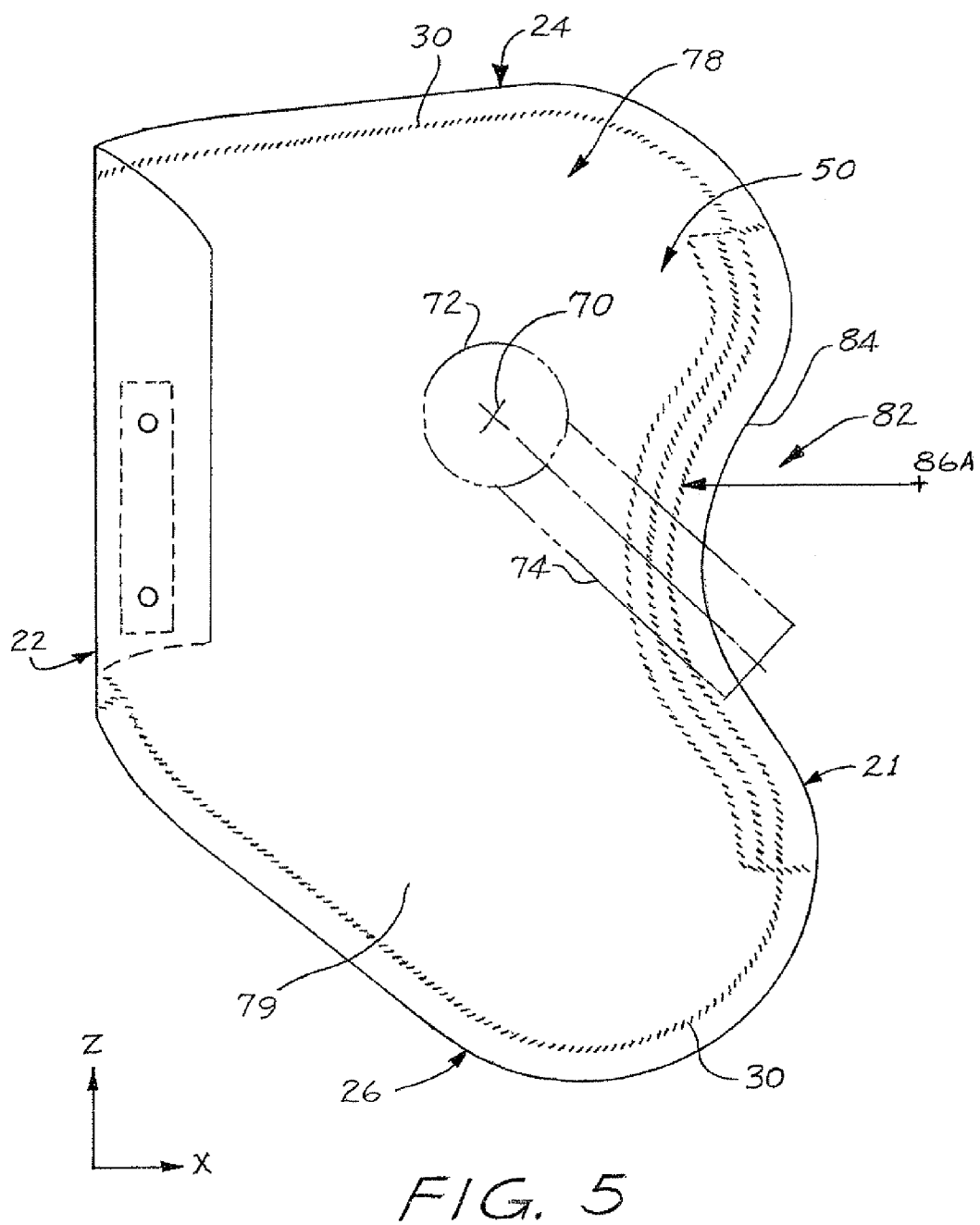
FIG. 5 is a side view of an alternate example of a side air bag in a deployed, uninflated state with an occupant or SID shoulder and upper arm shown in phantom lines.

As shown in FIG. 5, an alternate example of the side airbag 12 is shown. In this example, airbag 12 does not include a separate second chamber 58 in the lower portion 79 as shown in FIG. 1. In this example, there is a single chamber 50 generally defined by peripheral seam 30 and includes a relief 82 positioned along forward edge 21 as generally described above. As shown, relief 82 may include a recess 84 as generally described above. In a preferred example, recess 84 is positioned as shown along forward edge 21 and is enlarged through a larger radius 86A. Shoulder 72 and arm 74 shown in phantom lines are generally positioned at a 45 degree angle as generally described above. In this general position, arm 74 is in a lower portion of recess 84 as shown. In a preferred example, to compensate for the lack of a separate second chamber 58 in the pelvic region, lower portion 79 may be configured differently, for example enlarged and extending forward as shown in FIG. 5. In such instances, relief portion 82 may also move relative to the shoulder center axis. It is understood that in this example, the relief 82 and size and shape of the bag may vary from the illustration as described above without deviating from the present invention.

In further alternate examples (not illustrated), it is understood that airbag 12 can take different shapes, for example an increase in height of upper portion 78, to accommodate the environment the airbag 12 and seat 17 are positioned in as well as to meet future protection requirements without deviating from the present invention. Airbag 12 may further be made from one continuous sheet of material and simply folded and sewn or otherwise connected to form the first 18 and second layer 19 forming the first chamber 50.

In preferred exemplary operation and method of use, airbag 12 and inflation canister 14 are stored or housed in seatback of vehicle seat 17. Alternately, airbag 12 may be concealed behind an interior trim panel, for example a door trim panel 20. Airbag inflation canister 14 is in electronic communication with a controller 16 which is in electronic communication with sensors 15 which detect local accelerations or displacement of vehicle body panels in the event of an exterior vehicle impact or collision. On signal from the controller 16, inflation canister is activated to begin inflation of side airbag 12. In an example shown in FIG. 1, both first 50 and second 58 chambers are inflated with pressurized fluid, preferably air or other gas. Airbag 12 is forced outward from its stored position through a seam in the seatback or trim panel (not shown) and generally expands forwardly and laterally toward an occupant 11, or in a test condition, a SID.

As best seen in FIGS. 1-4 and 7, lower portion 79 of airbag 12 at a lower portion of the recess 84 contacts upper arm 74 and upper portion 78 contacts shoulder 72. In effectively simultaneous movement, airbag 12 imparts a principal lateral force 108 rearward of shoulder center axis 70 as lower portion 79 near the lower portion of relief 82 applies an upward force 110 on arm 74 forcing arm 74 toward recess 84. As airbag 12 continues toward full inflation, arm 74 is provided clearance by relief 82 through recess 84 to reduce or eliminate lateral motion of arm 74 toward an occupant 11 or SID abdomen, chest and rib areas and the resultant forces or loads thereon. In a preferred result, arm 74 is moved upward into recess 84 and laterally away from the occupant abdomen and chest.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An inflatable airbag for use in a passenger vehicle comprising:
    a first layer;
    a second layer positioned over the first layer, the first and second layers connected to one another about a periphery and defining a recess along a forward edge of the airbag, the recess is arcuate-shaped having a first point along the forward edge positioned above a passenger shoulder center axis, a second point positioned along the forward edge positioned below the shoulder center axis, an inner recess point oriented on an inner arc positioned rearward from the first and second points, the inner arc defined by a radius having a vertex point positioned forward of the forward edge, wherein during inflation of the airbag the recess provides a clearance between the forward edge of the airbag and a seated occupant arm to reduce contact of the airbag on the occupant arm.

2. The side airbag of claim 1 wherein the airbag substantially maintains a full lateral depth of the inflated airbag adjacent the occupant shoulder.

3. The side airbag of claim 1 wherein the first point is positioned about 35 millimeters above and about 130 millimeters forward of the shoulder center axis.

4. The side airbag of claim 1 wherein the second point is positioned about 139 millimeters below and about 95 millimeters forward of the shoulder center axis.

5. The side airbag of claim 1 wherein the inner recess point is positioned about 55 millimeters below and about 87 millimeters forward of the shoulder center axis.

6. The side airbag of claim 1 wherein the recess is positioned between a shoulder center axis and an occupant elbow along an arm longitudinal axis.

7. The side airbag of claim 1 further comprising an expansible first chamber and an expansible second chamber defined by the first and second layers, the first chamber positioned above the second chamber and including the recess.

8. The side airbag of claim 7 wherein the first chamber comprises a larger volume than the second chamber.

9. The airbag of claim 1 wherein at least one of the first point and the second points is positioned on the inner arc.

10. The airbag of claim 9 wherein the radius is substantially constant throughout the inner arc.

11. The airbag of claim 1 further comprises an arcuate-shaped upper edge in communication with the forward edge, the upper edge defined by a radius having a vertex substantially at the shoulder center axis.

12. The airbag of claim 11 wherein the radius defining the airbag upper edge is substantially constant along the upper edge between a first airbag opening and the forward edge.

13. An inflatable side airbag for use in passenger vehicle comprising:
an inflatable side airbag deployable between a vehicle panel and an occupant shoulder and arm, the airbag including a forward edge defining an arcuate-shaped recess extending rearward from the forward edge and positioned substantially between a shoulder center axis and an occupant elbow, the recess having a first point positioned along the forward edge above the shoulder center axis, a second point positioned along the forward edge below the shoulder center axis and an inner recess point oriented on an inner arc positioned rearward from the first and the second points, the inner arc defined by a radius having a vertex point positioned forward of the forward edge, wherein during inflation of the airbag the recess provides a clearance between the airbag forward edge and the occupant aim to reduce contact between the airbag forward edge and the occupant arm while substantially maintaining a full lateral depth of the airbag adjacent the occupant's shoulder.

14. The apparatus of claim 13 wherein the airbag comprises a first layer and a second layer connected to the first layer about a periphery defining a first expansible chamber.

15. The apparatus of claim 14 wherein during inflation the airbag applies a principal lateral force on the occupant shoulder rearward of the shoulder center axis.

16. The airbag of claim 13 further comprising a lower portion positioned below the recess inner point such that on inflation of the airbag the occupant aim is forced in a direction at least partially vertical.

17. A method for using an inflatable side airbag in a passenger vehicle to reduce lateral contact of an inflating airbag on the aim of a seated occupant, the method comprising:
providing an inflatable side airbag deployable between a side panel of a vehicle and an occupant shoulder and arm, the airbag having first and second points positioned on a forward edge;
inflating the side airbag thereby expanding the airbag in a lateral direction toward the passenger shoulder and arm; and
providing a recess in the airbag a positioned substantially between the occupant shoulder and elbow, the recess extending rearward from the forward edge toward a first chamber, the recess having an inner recess point positioned on an arc defined by a radius having a vertex point positioned forward of the forward edge for reducing lateral contact by the airbag on a portion of the occupant arm during inflation of the airbag.

18. The method of claim 17 further comprising the step of applying a principal lateral force by the inflating airbag on the occupant shoulder in an area rearward of a shoulder center axis.

19. The method of claim 17 further comprising the step of substantially maintaining a full lateral depth of the airbag adjacent the occupant shoulder.

20. The method of claim 17 further comprising the step of directing the occupant arm in at least a partially vertical direction during inflation of the airbag.

* * * * *